United States Patent [19]

Ando

[11] Patent Number: 5,321,801
[45] Date of Patent: Jun. 14, 1994

[54] DOCUMENT PROCESSOR WITH CHARACTER STRING CONVERSION FUNCTION

[75] Inventor: Makoto Ando, Saitama, Japan

[73] Assignee: Fuji Xerox Co., Ltd., Tokyo, Japan

[21] Appl. No.: 102,494

[22] Filed: Aug. 5, 1993

Related U.S. Application Data

[63] Continuation of Ser. No. 594,962, Oct. 10, 1990, abandoned.

[51] Int. Cl.⁵ .................. G06F 15/62; G06F 15/38
[52] U.S. Cl. ................................. 395/145; 395/144;
364/419.09; 364/419.1; 364/419.05; 345/157;
345/168
[58] Field of Search .............. 395/144, 145, 146, 148;
364/419, 419.1, 419.05, 419.09; 340/710, 711;
345/157, 168

[56] References Cited

U.S. PATENT DOCUMENTS

| | | | |
|---|---|---|---|
| 4,544,276 | 10/1985 | Horodeck | 400/110 |
| 4,777,600 | 10/1988 | Saito et al. | 364/419 |
| 4,891,786 | 1/1990 | Goldwasser | 364/900 |
| 4,894,779 | 1/1990 | Suzuki et al. | 364/419 |
| 5,140,521 | 8/1992 | Kozol et al. | 364/419 |

OTHER PUBLICATIONS

Vincent Alfieri, The Best Book of WordPerfect (version 5.0), 1989, pp. 61-80.

*Primary Examiner*—Gary V. Harkcom
*Assistant Examiner*—Joseph H. Feild
*Attorney, Agent, or Firm*—Finnegan, Henderson, Farabow, Garrett & Dunner

[57] ABSTRACT

A document processor includes: a CRT; a keyboard for inputting characters or codes; a kana-kanji converting device for converting the inputted characters or codes into a predetermined form; a start point mark displaying device for displaying on the CRT a most leading position of the characters or codes inputted by the keyboard and prior to effecting conversion by the kana-kanji converting device, by using a start point mark; a caret displaying device for displaying on the CRT a rearmost position of the characters or codes inputted by the keyboard and prior to effecting conversion by the kana-kanji converting device, by using a caret; a start point mark moving device for moving the start point mark to a position where the caret is displayed, when the kana-kanji converting device effects conversion of the characters or codes inputted; and a start point mark display on/off device for setting the display of the start point mark to off when the positions of display of the start point mark and the caret coincide with each other.

7 Claims, 6 Drawing Sheets

TIME (a) 明日は晴れです。昨日は雨でした。

(b) 明日は晴れです。∧ 昨日は雨でした。
　　　　　　　　　　　11

(c) 明日は晴れです。か∧昨日は雨でした。

(d) 明日は晴れです。かれ∧昨日は雨でした。

(e) 明日は晴れです。かれはいしゃです。∧ 昨日は雨でした。

(f) 明日は晴れです。彼は医者です。昨日は雨でした。

DOCUMENT PROCESSOR WITH CHARACTER STRING CONVERSION FUNCTION

This application is a continuation of application Ser. No. 07/594,962, filed Oct. 10, 1990, now abandoned.

BACKGROUND OF THE INVENTION

1. Field of the Invention

The present invention relates to document processors for converting inputted characters and codes (hereinafter simply referred to as characters) into a predetermined other form, such as Japanese word processors, and more particularly to document processors in which the range of characters to be converted is easily discernible without confusion with other function symbols or marks displayed in a display screen.

2. Discussion of the Related Art

Briefly, the Japanese writing style of kana, which includes hiragana and katakana, is a phonetic system wherein each Japanese kana character represents a vocal sound corresponding to a portion of a Japanese word. In contrast, kanji is a Japanese writing style wherein each Japanese character represents an entire word or idea. In some cases, a kanji character may not exist for a particular word or idea, therefore mandating the use of kana. This may result in a "mixed" writing style of kana and kanji.

Document processors, such as Japanese word processors and work stations for effecting Japanese word processing, are capable of producing kanji style writing according to a kana-to-kanji conversion method. Such document processors are arranged so that the phonetic spelling (pronunciation) of a text is inputted through a keyboard by means of hiragana, katakana, or Roman characters and then upon an instruction to convert that text to kanji, conversion to a mixed writing of kanji with kana is performed by accessing a built-in dictionary.

FIG. 8 illustrates an example of kana to kanji conversion by a conventional document processor. As shown in the part (a) of FIG. 8, it is assumed that sentences reading " 明日 は 晴 れ で す。 (It will be fine tomorrow)" and " 昨日 は 雨 で し た。 (It was rainy yesterday)" have already been prepared and are being displayed on the display screen and the sentence " 彼 は 医者 です。 (He is a doctor)" is to be inserted between " 晴 れ で す。 (It will be fine)" and " 昨日 は。 (yesterday)". As shown in the part (b) of FIG. 8, caret 11 for indicating the position for inserting the sentence is initially positioned between them.

Then, the operator enters a kana sentence equivalent to the phonetic spelling " かれ は い しゃ で す。 (He is a doctor)" as a pre-conversion sentence. The parts (c) and (d) of the figure illustrate the display screen as it changes over time. If a conversion key (not shown) on the key board is pressed when part (e) of the figure is displayed, kana-kanji conversion is effected with respect to the portion " かれは  いしゃです。 (He is a doctor)". Part (f) of the figure illustrates the completed conversion.

With conventional document processors, each time a character is entered, the caret 11 moves to indicate the position the next character will be entered. However, it is impossible for the operator to intuitively ascertain the range in which the pre-conversion characters are located, thereby presenting uncertainty to the operator. Particularly in cases where conversion is effected on a batch basis by entering a relatively long sentence, or in cases where hiragana and katakana are present continuously in post-conversion sentences sandwiching a pre-change sentence, such uncertainty increases.

FIG. 9 illustrates an example of a document processor for overcoming such a problem. With this document processor, a frame 22 for displaying the status of various operations is disposed in an upper portion of a window 21. Window 21 includes sentences which have been entered. Input characters to be converted are displayed in a specific area of the sentence. Accordingly, the operator is capable of confirming the position of the characters being entered by means of the caret 11, and may confirm the range of characters to be converted by viewing the specific area 23.

However, with the conventional document processor of the type in which the input characters are displayed in a separate location, as shown in FIG. 9, only the position for inserting or entering characters can be confirmed at the place where the entry is being actually made. Accordingly, in order to ascertain the range of the converted portion of the text, it is necessary for the operator to turn his or her eyes to the specific area 23 shown in FIG. 9, or a specially provided window, which undesirably reduces the operating efficiency.

Also, in the conventional apparatus, only the caret is displayed at the position for entering the characters on the display screen before and after the conversion of the characters. Hence, confusion frequently occurs between the characters which have been converted and those that have not been converted yet which may cause unnecessary repetitive conversion.

SUMMARY OF THE INVENTION

Accordingly, a primary object of the present invention is to provide a document processor which confirms the characters to be processed, i.e., designates the position of the characters to be converted from kana to kanji.

A second object of the present invention is to provide a document processor which makes it possible to easily determine whether or not the conversion of characters has been performed.

A third object of the present invention is to provide a document processor which uses two marks to indicate a range of characters wherein the marks do not interfere with each other on the display screen.

A fourth object of the present invention is to provide a document processor which improves the operating efficiency in kana-kanji conversion processing.

Additional objects and advantages of the invention will be set forth in part in the description which follows and in part will be obvious from the description, or may be learned by practice of the invention. The objects and advantages of the invention may be realized an attained by means of the instrumentalities and combinations particularly pointed out in the appended claims.

To achieve the objects and in accordance with the purpose of the invention, as embodied and broadly described herein, the document processor in accordance with a first aspect of the invention comprises: a display screen; input means for inputting characters or codes; converting means for converting :he inputted characters or codes into a predetermined form; start point mark displaying means for displaying on the display screen a most leading position of the characters or codes inputted by the input means and prior to effecting conversion by the converting means, by using a start point mark; and input point mark displaying means for displaying on the display screen a rearmost position of the characters or codes inputted by the input means and prior to effecting conversion by the converting means, by using an input point mark.

In accordance with the first aspect of the invention, a start point mark is displayed to indicate the most leading position of the characters or codes prior to conversion by the converting means which are inputted by the input means, while an input point mark constituted by a caret or the like is displayed to indicate the rearmost position thereof, thereby attaining the above-described primary object of the invention.

In accordance with a second aspect of the invention, the document processor in accordance with the first aspect of the invention further comprises: start point mark moving means for moving the start point mark to a position where the input point mark is displayed, when the converting means effects conversion of the characters or codes inputted.

In accordance with the second aspect of the invention, before conversion of the characters, the start point mark is located at a position different from that of the input point mark, and their positions coincide with each other immediately after the conversion of the characters, so that it is readily possible to discern whether or not the conversion of the characters has been completed, thereby attaining the second object of the invention.

In accordance with a third aspect of the invention, the image processor in accordance with the second aspect of the invention comprises: start point mark display on/off means for setting the display of the start point mark to off when the positions of display of the start point mark and the input point mark coincide with each other, thereby attaining the third object of the invention.

In accordance with the third aspect of the invention, when the start point mark has moved to the position where the input point mark is being displayed, as immediately after conversion of the characters, the display of the start point mark is set to off, so that the input point mark will not be displayed by overlapping with the start point mark, thereby attaining the third object of the invention.

In accordance with a fourth aspect of the invention, the image processor comprises: a CRT; a keyboard for inputting characters or codes; kana-kanji converting means for converting the inputted characters or codes into a predetermined form; start point mark displaying means for displaying on the CRT a most leading position of the characters or codes inputted by the keyboard and prior to effecting conversion by the kana-kanji converting means, by using a start point mark; caret displaying means for displaying on the CRT a rearmost position of the characters or codes inputted by the keyboard and prior to effecting conversion by the kana-kanji converting means, by using a caret; start point mark moving means for moving the start point mark to a position where the caret is displayed, when the kana-kanji converting means effects conversion of the characters or codes inputted; and start point mark display on/off means for setting the display of the start point mark to off when the positions of display of the start point mark and the caret coincide with each other.

In accordance with the fourth aspect of the invention, the range of characters subject to conversion when kana-kanji conversion processing is effected, and the movement of the start point mark and the setting off of the display in a predetermined case are effected, thereby attaining the fourth object of the invention.

The drawings, which are incorporated in and constitute a part of this specification, illustrate an embodiment of the invention and, together with the description, serve to explain the objects, advantages and principles of the invention.

BRIEF DESCRIPTION OF THE DRAWINGS

FIG. 6 is a plan view of the window illustrating a display after the characters " 彼は (he)" are entered;

FIG. 7 is a plan view of the window illustrating a state in which the characters " あなたは. (you)" are entered by kana after the entry of the sentence " 彼は医者です. (He is a doctor)" is determined;

DETAILED DESCRIPTION OF THE PREFERRED EMBODIMENT

Referring now to the accompanying drawings, a detailed description will be given of a preferred embodiment of the present invention.

Figure 1:
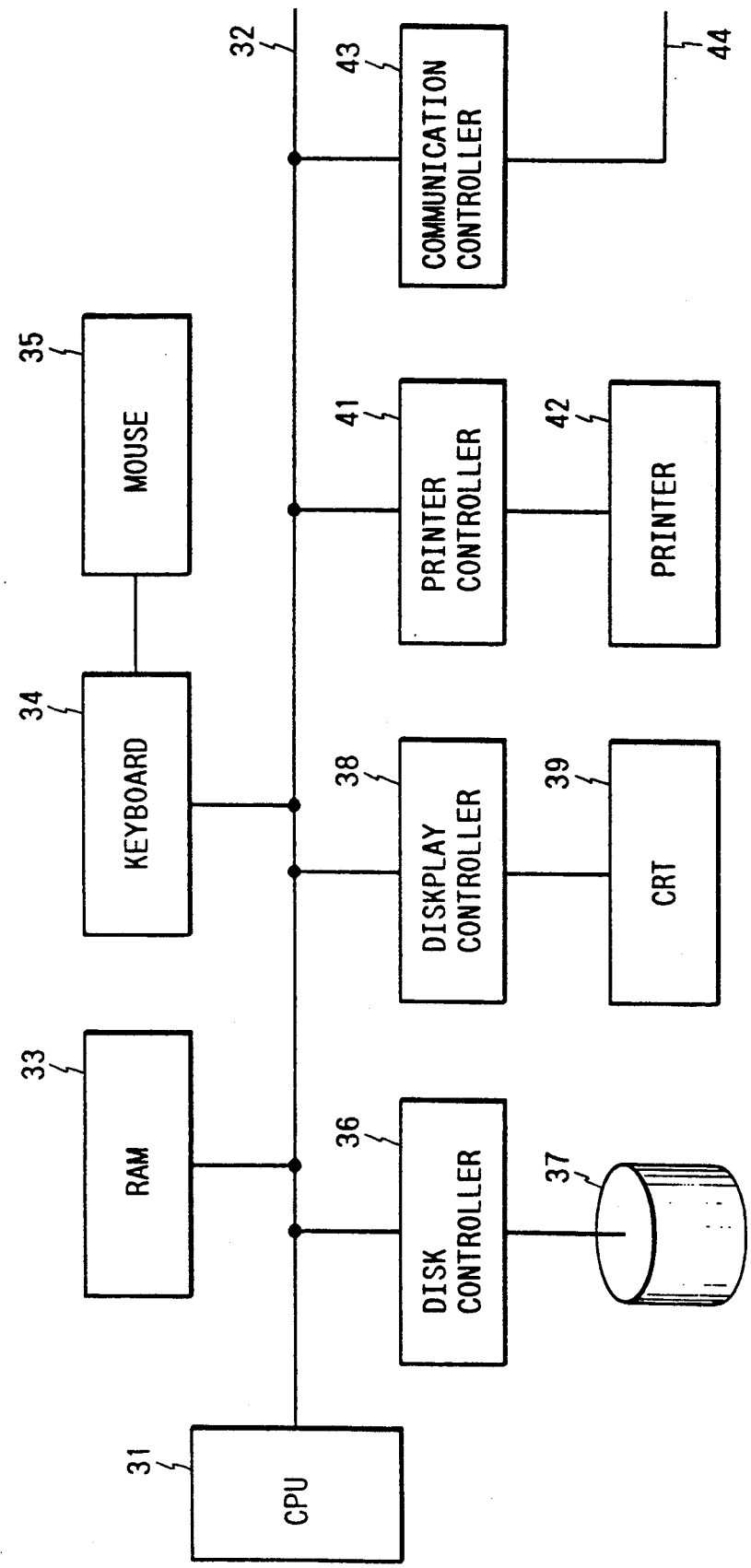
FIG. 1 is a block diagram schematically illustrating a circuit configuration of a document processor.

FIG. 1 schematically illustrates a circuit configuration of a document processor in accordance with an embodiment of the present invention. This document processor has a central processing unit (CPU) 31. The CPU 31 is connected to various circuit devices via a data bus 32. RAM 33 stores a program for controlling the processor, as well as temporary data used for control. A keyboard 34, connected to a mouse 35 for use as a pointing device, may be used to input data, such as characters. A disk controller 36, connected to a magnetic disk 37, controls the input and output of data. The magnetic disk 37 may be used to store the aforementioned program and document data. A CRT 39 is connected to a display controller 38 which controls the display of characters and images on the CRT 39. A printer controller 41 supplies printing data to a printer 42 to control printing. A communication controller 43 is connected to a communication cable, such as a telephone line and a bus 32, and transmits the prepared document data to another document processor and a printer (not shown).

In such a document processor, if characters are inputted in kana by the keyboard and conversion is designated, a dictionary, previously transferred to the RAM 33 from the magnetic disk 37, is retrieved and the kana-kanji conversion is implemented. The pre-conversion character data and the post-conversion character data are converted to character patterns in the display controller 38 and are stored in a built-in display memory. Marks, such as the start point mark and the caret used in this embodiment, are stored in predetermined positions of the display memory. The CRT 39 displays the contents of the display memory on the display screen.

Figure 2:
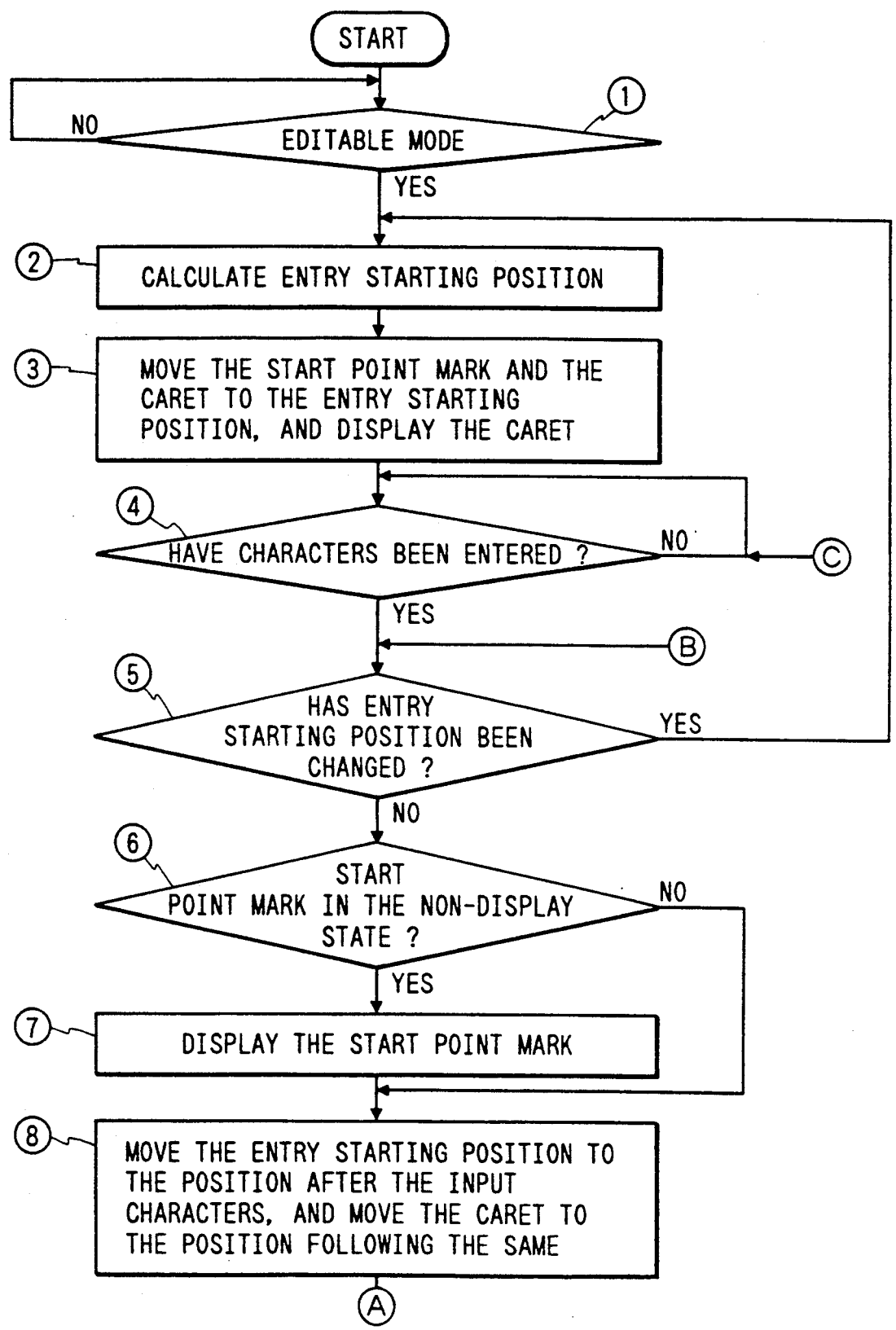
FIG. 2 is a flowchart illustrating the control of the processor during kana-kanji conversion.

It should be noted that where the document processor shown in FIG. 2 is connected to a printer, such as a laser printer via the communication controller 43, the printer controller 41 and the exclusive-use printer 42 may be omitted. In addition, it is possible to omit the communication controller 43 and the mouse 35 if supported by the document processor.

FIG. 2 illustrates the control of this document processor during kana-kanji conversion by the document processor.

The CPU 31 shown in FIG. 1 checks whether or not a document displayed on the CRT 39 has been placed in an edit mode (Step 1 in FIG. 2). The document processor enables documents to be placed in either an edit mode or a non-edit mode. For instance, a non-edit mode may be desirable if a document has been transmitted from another device merely for printing and/or display, but not for editing purposes.

If the document processor is in the edit mode (Y), the CPU 31 calculates a position for entering characters (Step 2). If the character entering position is designated by an operator using a mouse, the CPU 31 calculates data representing the designated position. On the other hand, absent such designation, the CPU 31 calculates data representing an initial position of the text or page. Characters may be inserted between sentences, or may be added to the end of a new sentence, for example. In addition, it is possible to overwrite characters of a previously prepared sentence. An example will now be described in which a sentence is inserted between two sentences. In Step 2, the position for inserting the sentence is calculated. The CPU 31 moves the start point mark and the caret to this entry starting position, and suppresses the display of the start point mark.

Figure 3:
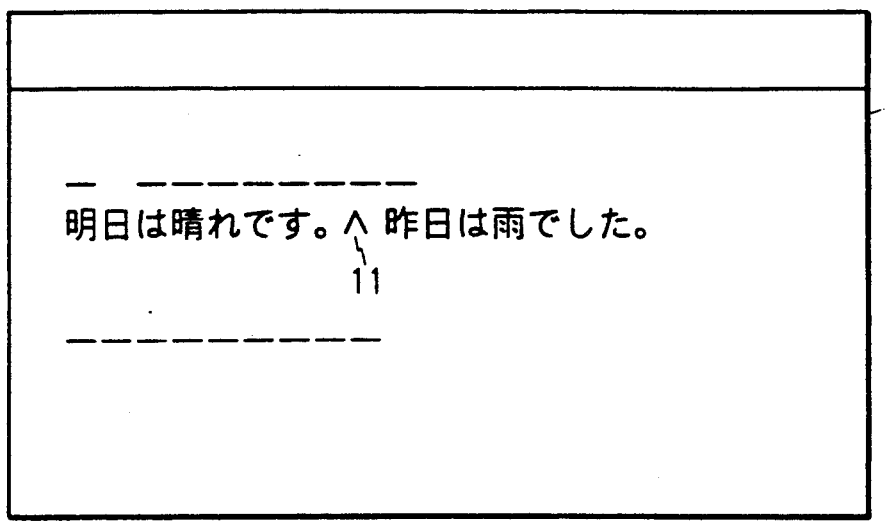
FIG. 3 is a plan view of a window illustrating a caret displayed at a position for inserting a sentence.

FIG. 3 illustrates a caret displayed at a predetermined position on the display screen. A window 51 for editing the document is open in the display screen, and a caret 11 is displayed at the position for inserting a sentence.

In this state the CPU 31 waits for the entry of characters (Step 4 in FIG. 2). When the operator enters the characters by the keyboard 34 (Y), a check is made as to whether or not there has been any change in the entry position by the operation of the mouse 35, or the cursor key on the keyboard 34. If there has been no change in the entry position (N), a check is made as to whether the display of the start point mark is suppressed (Step 6). If the start point mark display is suppressed, the state of the start point mark is changed to be displayed (Step 7). Then, the caret is moved to a position following the entered character (Step 8).

Figure 4:
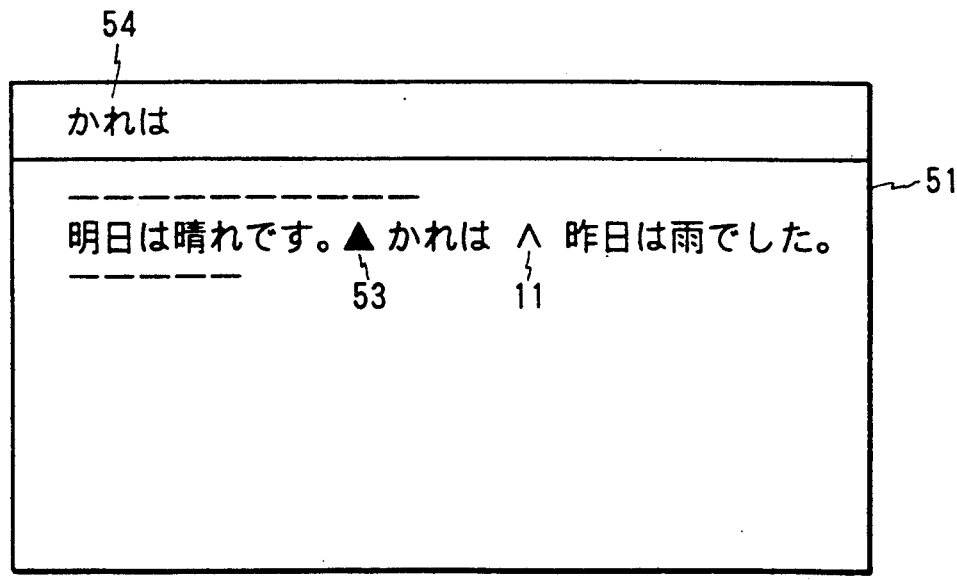
FIG. 4 is a plan view of the window illustrating the characters " かれは (he)" between 2 sentences.

FIG. 4 illustrates the display screen in Step 8 in which the characters " かれは, (he)" have been entered. The start point mark 53 is displayed after the sentence " 明日は 晴 れで す. (It will be fine tomorrow)". The unconverted characters " かれは (he)" are displayed after the start point mark 53, followed by the caret 11. The sentence " 昨日は ...(... yesterday)", which followed the sentence "will be fine" prior to the insertion, is now displayed after the caret 11. It should be noted that in this embodiment, an area 54 for displaying input characters in an upper portion of the window 51 is provided, and the unconverted input characters are displayed in this area as well.

Figure 5:
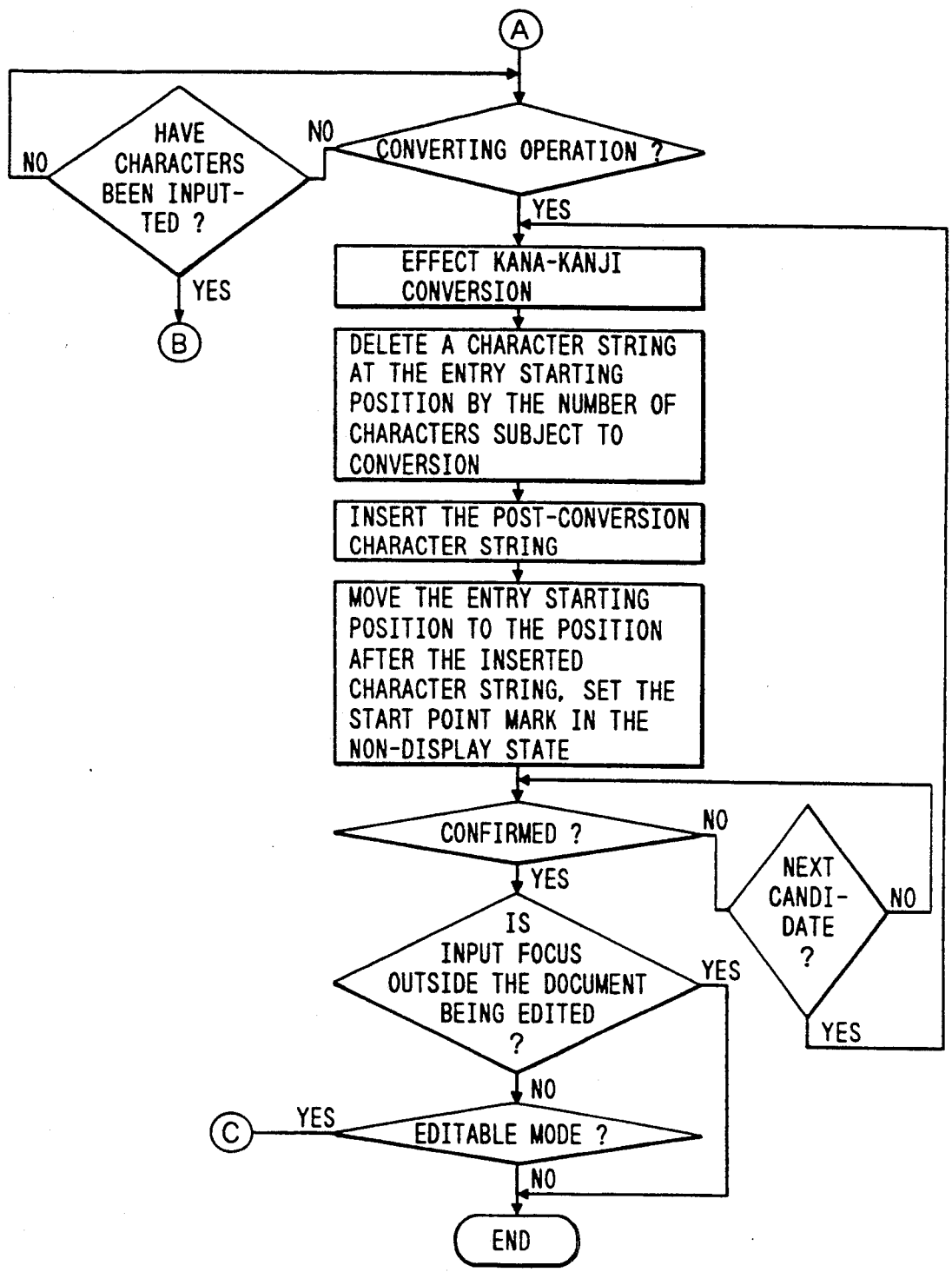
FIG. 5 is a flowchart illustrating the control of the processor during kana-kanji conversion.
Figures 8, 9:
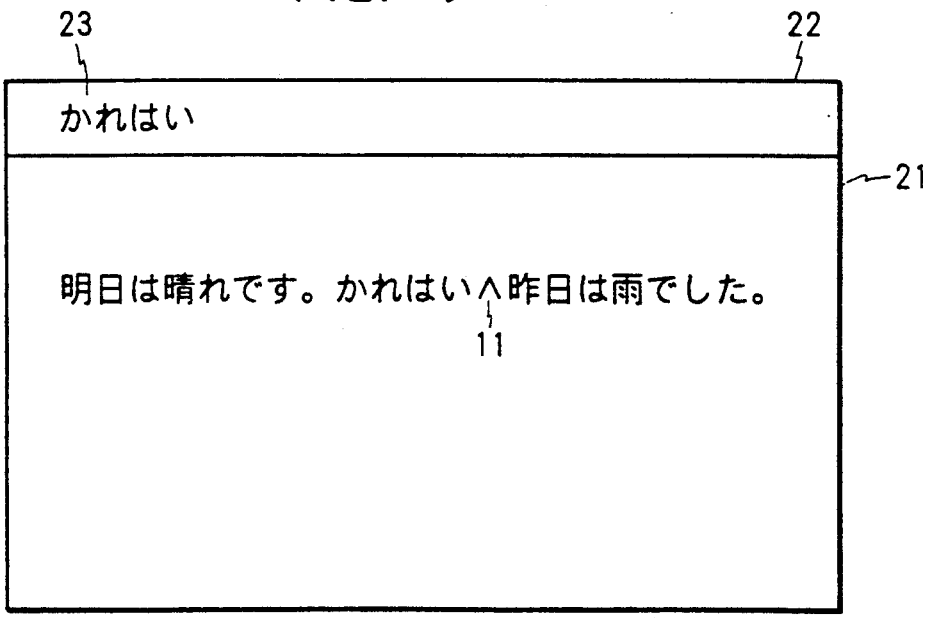
FIG. 8 is a diagram illustrating the operation of kana-kanji conversion by a conventional document processor.
FIG. 9 is a plan view of the window of the conventional document processor in which the range of entry of characters can be confirmed.

FIG. 5 illustrates the flow of control following FIG. 2. For example, the operator inserts the sentence " 彼は 医者です., (He is a doctor)" in the sentence inserting mode. The conversion operation may be designated after entering all the kana " かれは いしゃです., (He is a doctor)", or the conversion operation may be designated at an intermediate stage of the sentence, for instance, after fragments of the sentence, such as the characters " かれは " or " かれ ", have been entered. The CPU 31 monitors which of the conversion operations and the character entries have been carried out (Steps 9, 10). When the entry operation is completed (Step 9; Y), kana-kanji conversion is performed on the characters that have been entered (Step 11). On the other hand, if additional entry of characters is desired, the operation returns to Step 5 for additional display of entered kana characters, the caret 11 is moved accordingly, and the start point mark 53 is not changed.

When the operation of kana-kanji conversion is completed (Step 11); the CPU 31 controls display of the result of the conversion at an appropriate position in the window 51. That is, the character string subject to conversion is deleted at the entry starting position (Step 12). As a result, the arrangement of the characters becomes identical to the one shown in FIG. 3. Then, the character string resulting from the kana-kanji conversion is inserted (Step 13). Subsequently, the start point mark 53 is moved to the position after the inserted character string, and the display of the start point mark 53 is suppressed (Step 14). The start point mark 53 is turned-off because the start point mark 53, if displayed, would overlap with the caret 11.

FIG. 6 illustrates the result when the operator has entered the characters " かれ (he)" and designated kana-kanji conversion, the characters are correctly converted to " 彼は (he)", and the contents are displayed on the display screen. The caret 11 is displayed between the phrase " 彼は (he)" and the phrase " 昨日 ...(... yesterday)". The start point mark is also disposed at this position, but is not displayed.

Referring back to FIG. 5, if kana-kanji conversion is performed and its result is satisfactory, the operator enters a "confirmation" instruction (Step 15). This instruction may be inputted by, for instance, pressing a key (not shown) on the keyboard 34. If the kana-kanji conversion produces an unsatisfactory result (Step 15; N), the operator enters an instruction to continue the kana-kanji conversion to produce an alternative kanji string. This instruction may also be indicated by, for instance, operation of the keyboard 34. When the operator gives the instruction to continue the kana-kanji conversion (Step 16; Y), the operation returns to Step 11.

Thus, when the kana-kanji conversion is finally confirmed (Step 15, Y), the CPU 31 checks whether or not the input focus is outside the document being edited (Step 17). The case in which the input focus is outside the document being edited refers to a situation such that the operation is effected outside the window 51 subjected to editing. In this case, (Y), the above-described operation ends (End). In other cases (N), a check is made as to whether or not the document processor is set in the edit mode (Step 18), and if not (N), the operation is ended in a similar manner. If the editable mode is continuing (Y), the operation returns to Step 4 in FIG. 2 to wait for the entry of ensuing characters.

FIG. 7 illustrates the display screen after the entry of the sentence " 彼は医者です。 (He is a doctor.)" is confirmed, and the character " あなたは (you)" are newly entered by kana.

In some cases, after the operator has inserted a sentence at one location, he or she inserts another sentence in the same window 51. In such a case, the entry starting position is changed to a new position (Step 5; Y). The CPU 31 then, in a similar fashion, calculates the entry starting position (Step 2), and controls the entry of the sentence and the display of the start point mark 53 and the caret 11 with respect to the new entry starting position.

In the above-described embodiment, a description has been given of the insertion of a sentence. The display of the range of an unconverted character string can be performed with respect to the other cases by displaying the start point mark and the input point mark as previously described. Although the previous description has related to the conversion of Japanese kana to kanji, the present invention can be similarly applied to cases where one language is translated into another, as in the case of translating Japanese into English, to more clearly indicate or designate an area or region to be processed.

As described above, in accordance with a first aspect of the invention, since the unconverted characters are displayed by using the start point mark and the input point mark, the operator may ascertain the range of the unconverted characters without turning his or her eyes, with the advantage that the converting operation can be conducted accurately and efficiently.

In addition, in accordance with a second aspect of the invention, since the start point mark is moved to the position where the input point mark is displayed after the conversion of the input characters, it is readily possible to determine whether or not the input characters have been converted.

Furthermore, in accordance with a third aspect of the invention, since the display of the start point mark is suppressed when the position of the start point mark and the position of the input point mark coincide, the start point mark will not be mistaken for the input point mark, and the marks will not be obscured due to overlapping of the marks. Hence, the reliability of the document processing is improved.

In accordance with a fourth aspect of the invention, since the present invention is applied to kana-kanji conversion, there is the advantage that the converting operation can be smoothly performed even where batch conversion of long sentences is carried out.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended thereto, and their equivalents.

What is claimed is:

1. A document processor comprising:
   a display means;
   means for sequentially entering each of a plurality of input characters defining an input character string in accordance with a first text format;
   means, responsive to the entering means, for cumulatively displaying each of the sequentially entered input characters on said display means to display said input character string in the first text format at a point in displayed preexisting text having preexisting characters based on a second text format;
   means for converting said input character string from the first text format into the second text format;
   means for displaying a start point mark on said display means, prior to conversion of said input character string by said converting means, at a character string position at which a first of said sequentially entered input characters in the first text format is displayed, to indicate the beginning of the input character string in the first text format;
   means for displaying an end point mark on said display means, prior to conversion of said input character string by said converting means, adjacent to a character string position at which the most recently entered of said sequentially entered input characters in the first text format is displayed, to indicate the end of said input character string in the first text format; and
   means responsive to the entry of new characters for moving said end point mark from its existing character string position to the character string position of the most recently entered character.

2. A document processor according to claim 1, further comprising means for moving said start point mark to a position at which said end point mark is displayed after said converting means converts the input character string, and means for suppressing the display of said start point mark when the positions of said start point mark and said end point mark coincide with each other to avoid overlap of said start point mark with the display of said end point mark.

3. A document processor according to claim 2, further comprising means for displaying on said display means a plurality of character strings representing preexisting text of a document in accordance with the second text format, wherein said means for cumulatively displaying said sequentially specified input characters in the first text format includes means for displaying said sequentially specified input characters in the first text format on said display means at a specified entry point relative to said plurality of character strings representing in the second text format the preexisting text of the document.

4. A document process comprising:
   a cathode ray tube (CRT) display;
   a keyboard means for specifying an input kana character string;
   means, responsive to said keyboard means, for displaying said input kana character string on said CRT display;
   kana-kanji converting means for converting the input kana character string into a kanji character string;
   means for displaying a start point mark on said CRT display, prior to conversion of said input kana character string by said kana-kanji converting means, at a position corresponding to the beginning of said input kana character string;
   means for displaying a caret on said CRT display, prior to conversion of said input kana character string by said kana-kanji converting means, at a position corresponding to the end of said input kana character string;

means for moving said start point mark to a position on said CRT display at which said caret is displayed after said kana-kanji converting means converts the input kana character string; and means for suppressing the display of said start point mark when the positions of said start point mark and said caret on said CRT display coincide with each other to avoid overlap of said start point mark with the display of said caret.

5. A document processor according to claim 4, further comprising means for displaying on said CRT display a plurality of character strings representing preexisting text of a document in accordance with the second text format, wherein said means for displaying said input character string in the first text format includes means for displaying said input character string in the first text format on said CRT display at a specified entry point relative to said plurality of character strings representing in the second text format the preexisting text of the document.

6. A document processor comprising:

display means;

means for specifying an input character string in accordance with a first text format;

means, responsive to said specifying means, for displaying said input character string in the first text format on said display means at a point in a displayed preexisting text having characters based on a second text format;

converting means for converting the input character string from the first text format into the second text format;

means for displaying a start point mark on said display means, prior to conversion of said input character string by said converting means, at a position corresponding to the beginning of said input character string in the first text format;

means for displaying an end point mark on said display means, prior to conversion of said input character string by said converting means, at a position corresponding to the end of said input character string in the first text format;

means for moving said start point mark to a position on said display means at which said end point mark is displayed after said converting means converts the input character string to the second text format; and means for suppressing the display of said start point mark when the positions of said point mark and said end point mark on said display means coincide with each other to avoid overlap of said start point mark with the display of said end point mark.

7. A document processor according to claim 6, further comprising means for displaying on said display means a plurality of character strings representing preexisting text of a document in accordance with the second text format, wherein said means for displaying said input character string in the first text format includes means for displaying said input character string on said display means in the first text format at a specified entry point relative to said plurality of character strings representing preexisting text in the second format.

* * * * *

UNITED STATES PATENT AND TRADEMARK OFFICE
CERTIFICATE OF CORRECTION

PATENT NO. : 5,321,801
DATED : June 14, 1994
INVENTOR(S) : Makoto Ando

It is certified that error appears in the above-indentified patent and that said Letters Patent is hereby corrected as shown below:

Claim 4, Column 8, Line 52 change "process" to --processor--.

Signed and Sealed this

Third Day of January, 1995

Attest:

BRUCE LEHMAN

Attesting Officer         Commissioner of Patents and Trademarks